(12) United States Patent
Chan et al.

(10) Patent No.: US 7,200,103 B2
(45) Date of Patent: Apr. 3, 2007

(54) REDUCED ALGORITHM RECEIVER

(75) Inventors: Alan Chan, Merrimack, NH (US); Alan M. Bartlett, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1011 days.

(21) Appl. No.: 10/176,011

(22) Filed: Jun. 20, 2002

(65) Prior Publication Data
US 2003/0026196 A1  Feb. 6, 2003

Related U.S. Application Data

(60) Provisional application No. 60/299,917, filed on Jun. 21, 2001.

(51) Int. Cl.
*H04L 5/04* (2006.01)
*H03D 1/04* (2006.01)

(52) U.S. Cl. .................. 370/204; 375/340; 375/346

(58) Field of Classification Search ............ 370/203, 370/204, 208, 342, 335, 441; 375/150, 326, 375/340, 262, 341, 346, 348
See application file for complete search history.

(56) References Cited

U.S. PATENT DOCUMENTS

| 5,644,592 | A | 7/1997 | Divsalar et al. | 370/18 |
|---|---|---|---|---|
| 5,790,606 | A | 8/1998 | Dent | 375/348 |
| 5,917,852 | A | 6/1999 | Butterfield et al. | 375/200 |
| 5,982,813 | A | 11/1999 | Dutta et al. | 375/219 |
| 6,122,269 | A | 9/2000 | Wales | 370/338 |
| 6,148,041 | A | 11/2000 | Dent | 375/340 F |
| 6,172,969 | B1 | 1/2001 | Kawakami et al. | 370/342 |
| 6,198,775 | B1 | 3/2001 | Khayrallah et al. | 375/265 |
| 6,219,341 | B1 | 4/2001 | Varanasi | 370/252 |
| 6,985,516 | B1 * | 1/2006 | Easton et al. | 375/150 |
| 2002/0037061 | A1 | 3/2002 | Learned | 375/346 |
| 2002/0196844 | A1 * | 12/2002 | Rafie et al. | 375/232 |

* cited by examiner

*Primary Examiner*—Chau Nguyen
*Assistant Examiner*—Marccus Smith
(74) *Attorney, Agent, or Firm*—Walter F. Dawson

(57) ABSTRACT

A code-enhanced, multi-user detection, Reduced Algorithm Receiver in a multiuser communication system reduces the signal processing requirements by limiting the number of searches between consecutive symbol cycles using information from an encoder state diagram. The Receiver makes use of a convolutional encoder's state machine properties to mark possible transitions as invalid based on the current state of the multiple users'encoders, thus removing them from the search tree. The Reduced Algorithm Receiver comprises a Signal Sampler for converting a single composite waveform signal ($R_x$) to digitized composite signal ($DR_x$), a Parameter Estimator for determining waveform characteristics of each of the multiple users, a Memory for storing predetermined training sequences for each of the users, a Next State Predictor that reduces the amount of symbols being checked during a current cycle, a Waveform Approximator that receives the user waveform characteristics data and a set of possible bits from the next state predictor and attempts to simulate modulation of the individual user signal, a Demodulator for comparing the set of possible composite waveforms ($\sim T_x$) from the Waveforms Approximator to the digitized composite waveforms ($DR_x$) and determining the best match waveform, and a Convolutional Decoder for receiving the best match symbols and decoding them for each of the users.

12 Claims, 10 Drawing Sheets

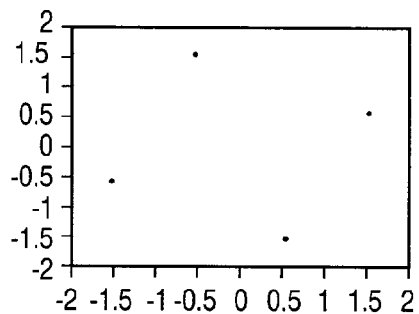
USER 1 CONSTELLATION 90
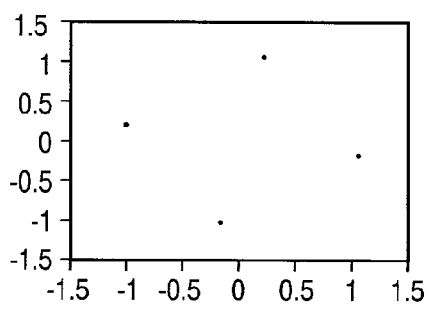
USER 2 CONSTELLATION 92
FIG. 8A
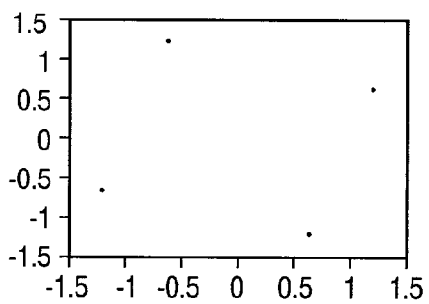
USER 3 CONSTELLATION 94
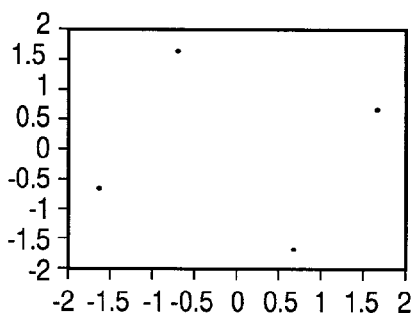
USER 4 CONSTELLATION 96

REDUCED ALGORITHM RECEIVER

This is a nonprovisional patent application claiming priority of provisional patent application Ser. No. 60/299,917, filed Jun. 21, 2001.

BACKGROUND OF THE INVENTION

1. Field of the Invention

This invention relates to a multi-user communication system and in particular to a reduced algorithm receiver that limits the number of searches between consecutive symbol cycles using information from an encoder state diagram thereby reducing the amount of symbols being checked and signal processing requirements.

2. Description of Related Art

A co-channel, multi-user environment poses a severe signal processing challenge, as the number of users increases, the number of possible signal states that must be evaluated by the receiver rises exponentially. Despite dramatic improvements in processor speeds, the higher frequencies utilized in many communications systems require efficient real-time signal processing. Many systems employ convolutional encoding.

Prior art methods for multi-user detection match every possible combination of transmitted data from multiple users to determine the best-fit (most likely) match of the transmitted and received data. This match is an estimation of the actual transmission of each user. As the number of users increases, the processing requirements increase exponentially.

U.S. Pat. No. 5,790,606 issued Aug. 4, 1998 to Paul W. Dent and assigned to Ericsson Inc., of North Carolina discloses a type of modulation using multiple spatially distributed antennas and recombines that data of a receiver for post-processing. A modified Viterbi (maximum likelihood) decoder is used to decode the bits from the multiple users and multiple antennas. The operation of this system is questionable when bit transitions of the various co-channel transmitters are not aligned in time at every antenna (a virtual impossible condition to meet). Also, this system is very complex and can be very large depending on the space required for the multiple antennas.

U.S. Pat. No. 5,917,852 issued Jun. 29, 1999 to Lee A. Butterfield et al. and assigned to L-3 Communications Corporation of New York, N.Y. discloses a method and apparatus of using independently scrambled Code Division Multiple Access (CDMA) signals to reduce the multi-user interference between the different radios in the system. However, the scrambling occurs outside the actual error correction encoding process and adds additional complexity to the signal.

U.S. Pat. No. 6,122,269, issued to Wales on Sep. 19, 2000 performs multiuser detection and parameter estimation for a packet radio application. This procedure uses MUD to jointly demodulate packets which have unintentionally collided in time. The procedure uses known symbol sequences to solve for the unknown channel impulse response coefficients, and a correlation process to locate the positions of the known symbol sequences. In the case of short "snapshots" (vectors of received waveform samples), the correlation process will produce noisy data, and inaccurate known symbol sequence position estimates.

U.S. patent application Publication Ser. No. US 2002/0037061 A1, published Mar. 28, 2002, entitled "System For Parameter Estimation and Tracking of Interfering Digitally Modulated Signals", filed Aug. 31, 2001, by Rachael L. Learned, application Ser. No. 09/943,770 and assigned to the present Assignee discloses a multiuser detection system in which interfering signals are purposely allowed to exist. A parameter estimation unit is provided which utilizes parallel processing for determining the channel for each received signal, which, in essence provides for each signal the received power, multipath structure, phase of the oscillator, timing offset relative to the base station clock and carrier frequency offset, with the system providing realtime uninterrupted estimates of these parameters required by the signal separation unit. However, this MUD system estimates the parameters by assuming that signals are added to the propagation channel one at a time.

SUMMARY OF THE INVENTION

Accordingly, it is an object of this invention to provide a code enhanced multi-user detection reduced algorithm receiver in a multi-user communications system.

It is another object of this invention to provide a next state predictor to simplify the signal processing requirements by utilizing previous detected symbols to reduce the number of possible symbols that must be checked during a current cycle.

These and other objects are further accomplished by a multiuser communication system comprising at least two co-channel interfering user transmitters, a reduced algorithm receiver having an antenna for receiving a composite waveform signal from the transmitters, the receiver further comprises a signal sampler for converting the composite waveform signal to a digitized received composite signal, a decision processor coupled to the signal sampler for limiting the number of searches between consecutive symbol cycles using information from an encoder state diagram, and convolutional decoders coupled to the output of the decision processor for receiving user symbols and decoding encoded data from the user transmitters. The decision processor comprises a memory for storing predetermined data including training sequences for each of the user transmitters, a parameter estimator coupled to the signal sampler for determining waveform characteristics from each of the user transmitters, a next state predictor coupled to the memory for receiving the predetermined data for reducing the number of the user symbols being checked during a current cycle in accordance with an update bit, a waveform approximator coupled to outputs of the next state predictor and the parameter estimator for generating a set of possible composite waveforms, and a demodulator for comparing the set of possible composite waveforms to the digitized received signal to determine a best match waveform corresponding to a best choice symbol for a given symbol interval.

The objects are further accomplished by a reduced algorithm receiver comprising means for converting a received composite waveform signal representing co-channel interfering users to a received digital composite signal, means for storing predetermined data including training sequences for each of the users, means, coupled to the storing means, for predicting a set of possible next data in accordance with encoder data received from the storing means, means coupled to an output of the waveform characteristics determining means and an output of the next state predicting means for simulating modulation of individual user signals, and means, coupled to the output of the means for simulating modulation of individual user signals, for comparing a set of possible composite waveforms to the received digital composite signals and determining a best matched symbol. The receiver comprises convolutional decoders, coupled to the output of the comparing means, for receiving user symbols and decoding data sent by the users. The means for determining waveform characteristics of each of the users comprises means for determining amplitude and phase shift. The means for determining waveform characteristics of each of the users receives the training sequences for each of the users from the storing means. The encoder data received by the means for predicting a set of possible next data includes generator polynomials used by a convolutional encoder for each user. The means for comparing a set of possible composite waveforms to the received digital composite signals includes means for performing a minimum means square error distance calculation for determining the best matched waveform for a particular symbol period. The means for predicting a set of possible next data reduces the number of states which must be searched during each symbol interval by eliminating invalid next states.

The objects are further accomplished by a reduced algorithm receiver comprising signal sampler for downconverting and digitizing a received composite waveform signal, a memory for storing predetermined data including training sequences for each of the user transmitters, a parameter estimator coupled to the signal sampler for determining waveform characteristics from each of the user transmitters, a next state predictor coupled to the memory for receiving the predetermined data for reducing the number of the user symbols being checked during a current cycle in accordance with an initial state or an update by an update bit, a waveform approximator coupled to outputs of the next state predictor and the parameter estimator for generating a set of possible composite waveforms, and a demodulator for comparing the set of possible composite waveforms to the digitized received signal to determine a best match waveform corresponding to a best choice symbol for a given symbol interval. The receiver comprises a convolutional decoder for receiving user symbols and decoding encoded data from the user transmitter.

The objects are further accomplished by a method of providing a reduced algorithm receiver comprises the steps of converting a received composite waveform signal representing co-channel interfering users to a received digitized composite signal, determining waveform characteristics of the digitized composite signal for each of the users, storing in a memory predetermined data including training sequences for each of the users, predicting a set of possible next state data for limiting the number of symbol searches between consecutive symbol cycles in accordance with the data from the memory, simulating modulation of individual user signals, based on the waveform characteristics received from a parameter estimator and in accordance with the set of next state data, to produce a set of possibly transmitted composite waveforms, and comparing the set of possibly transmitted composite waveforms to the received digital composite signals and determining a best match symbol corresponding to a best choice symbol for a given symbol interval. The method includes the steps of receiving the best match symbol in a convolutional decoder and decoding data sent by the users.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 8A illustrates examples of co-channel interfering individual user constellations for four different users;

DESCRIPTION OF ILLUSTRATIVE EMBODIMENTS

Figure 1:
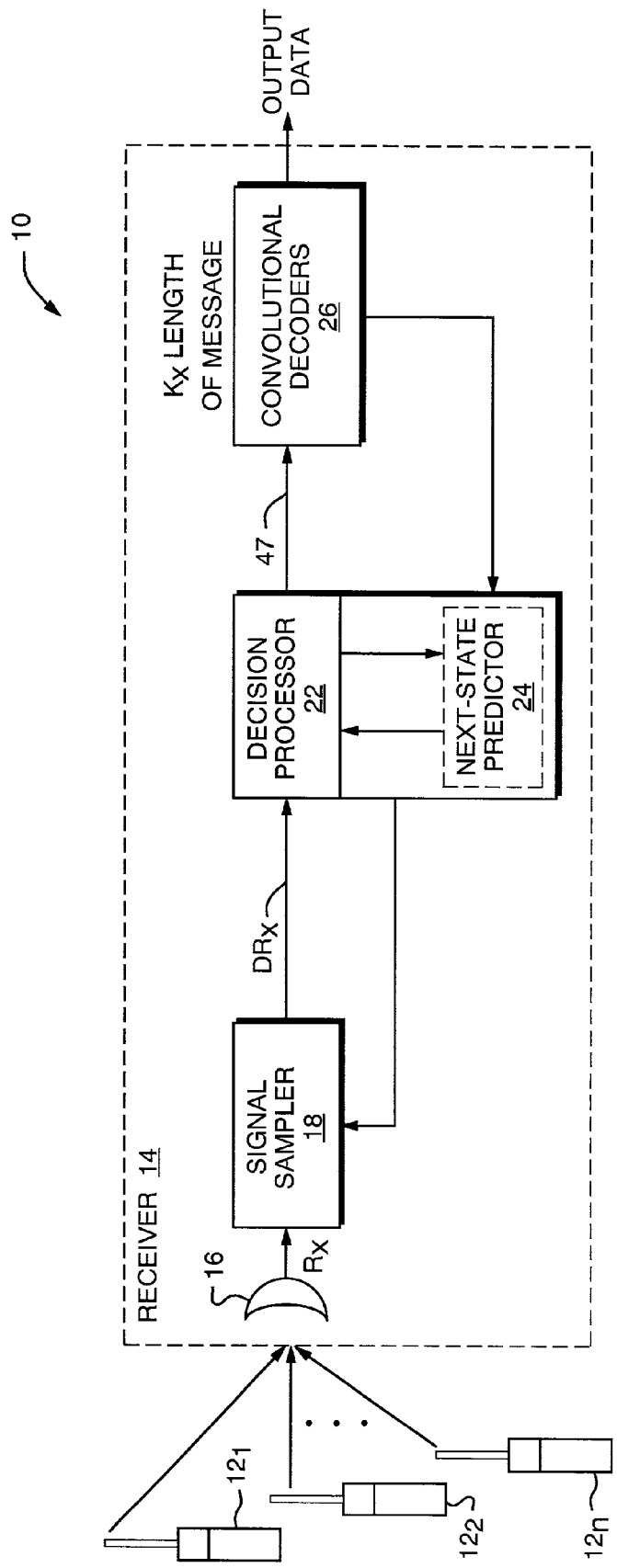
FIG. 1 is a system block diagram of a Multiuser Communication System which includes a multiuser detection Reduced Algorithm Receiver of the present invention.

Referring to FIG. 1, a system block diagram is shown of a multi-user communications system 10 which includes a Reduced Algorithm Receiver 14. The Receiver 14 comprises a Signal Sampler 18 which feeds the digitized composite signals $DR_x$ from interfering users to a Decision Processor 22. The Decision Processor 22 converts the detected composite signals to individual user symbols 47 which are sent to Convolution Decoders 26. The Convolutional Decoders 26 decode the individual user symbols to output data bits.

Two or more interfering co-channel Users $12_1$, $12_2$–$12_n$ transmit signals to the Reduced Algorithm Receiver 14. The Signal Sampler 18 of Receiver 14 samples a single composite waveform signal $(R_x)$ received from Antenna 16, wherein the composite waveform signal $R_x$ is the sum of the individual signals from co-channel interfering Users $12_1$–$12_n$ plus noise. The Signal Sampler 18 converts the analog received signal $R_x$ from Antenna 16 to the digital representation $(DR_x)$ of the received signal, $R_x$, useable by the Decision Processor 22. The Decision Processor 22 then converts the output from the Signal Sampler 18 to individual user symbols via several software component functions. A Next-State Predictor 24, which is one of the software components in the Decision Processor 22, simplifies the signal processing requirements by utilizing previously detected symbols to reduce the number of possible symbols that must be checked in the current cycle.

Figure 2:
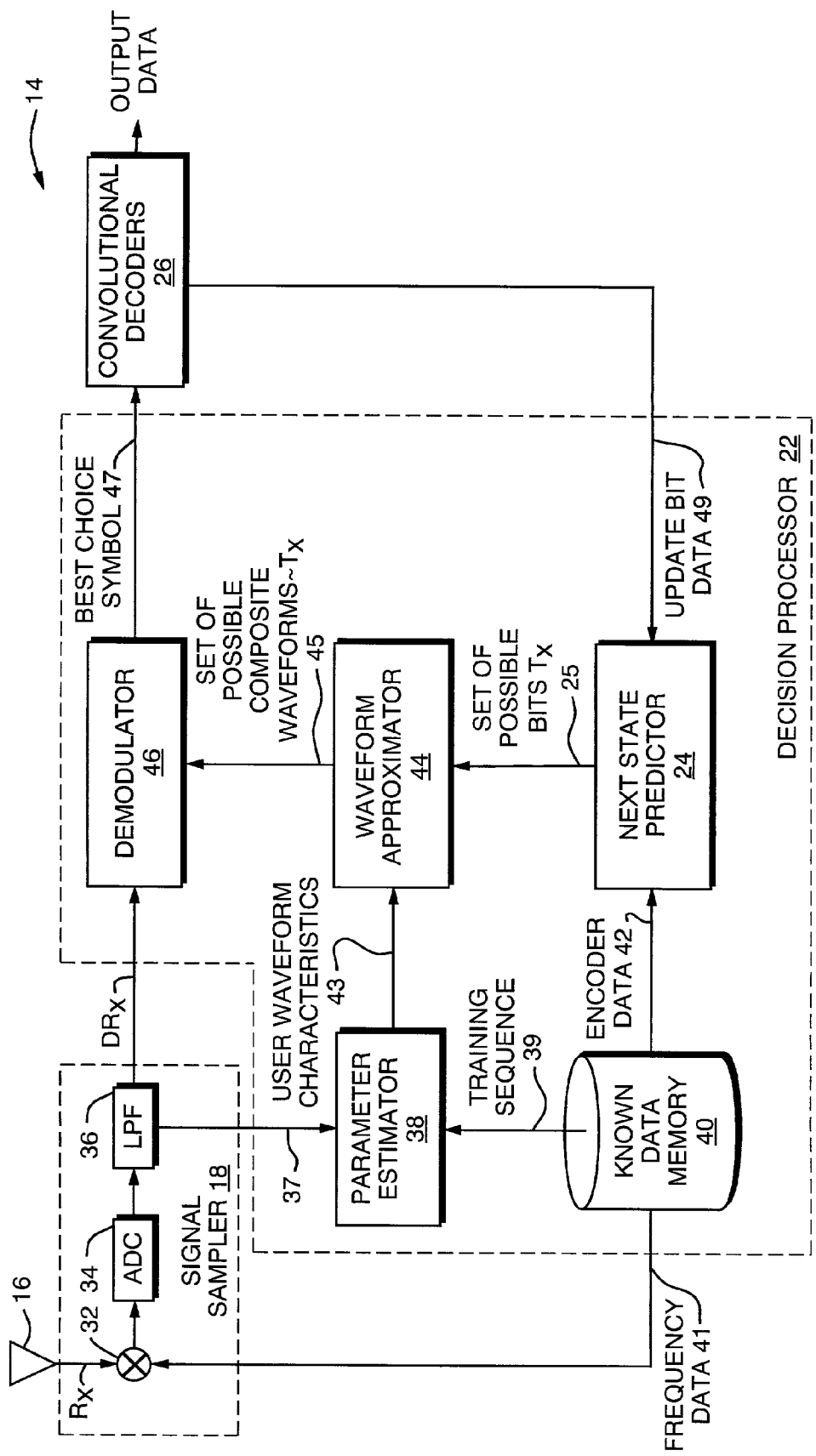
FIG. 2 is a functional block diagram of the multiuser detection Reduced Algorithm Receiver of FIG. 1.

Referring to FIG. 2, a functional block diagram of the Reduced Algorithm Receiver 14 is shown. A composite waveform signal $(R_x)$ from Antenna 16 is received by the Signal Sampler 18 comprising a Down Converter 32, Analog to Digital Converter (ADC) 34 and Low Pass Filter 36. The Down Converter 32 shifts the received composite signal $R_x$ down in frequency so that it can be sampled by the ADC 34 at an achievable rate. The ADC 34 transforms an analog voltage signal to a digital approximation of the received waveform. The ADC 34 includes two parameters, resolution and sampling frequency, set to ensure an accurate representation of the analog signal. The output of the ADC 34 is coupled to the Low Pass Filter (LPF) 36 which cuts out all components of the digitized signal that are not within the expected transmitted bandwidth. The output from the signal sampler 18 is the digitized signal ($DR_x$).

The digitized signals ($DR_x$) from the Signal Sampler 13 are sent to a Demodulator 46 and a Parameter Estimator 38 and both of these functions are performed by software components running in the Decision Processor 22. The Decision Processor 22 may be embodied by software components executed by either one or multiple general purpose processors (Intel, AMD, or PowerPC) or FPGA (Field Programmable Gate Array) that has the speed required to complete the data processing at the transmission rate required. In this configuration, the platform is not constrained to any processor, but can be implemented on a general purpose computer. An alternate embodiment of the Decision Processor 22 may be a Single-Board System with one or more processors.

Figure 3:
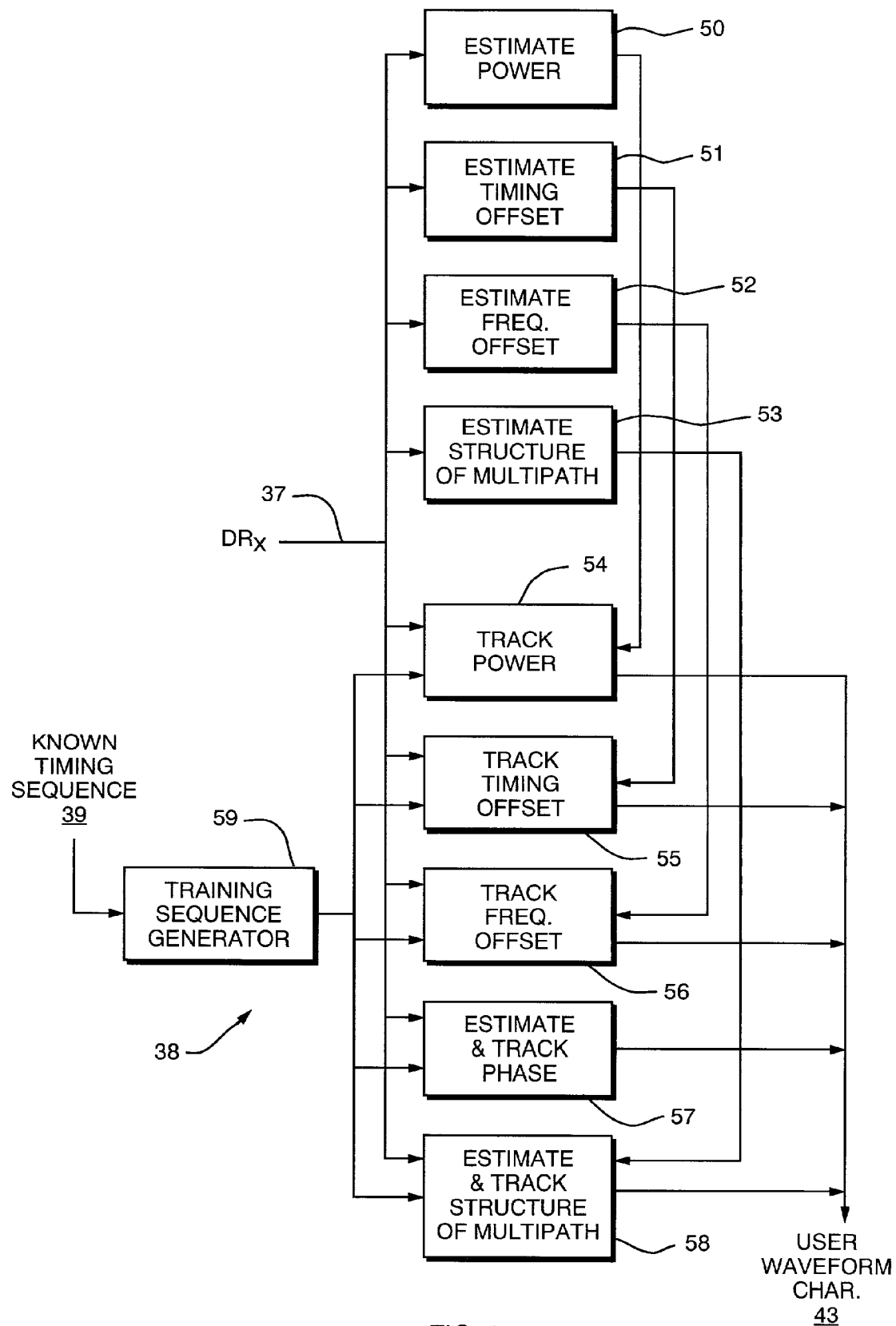
FIG. 3 is a block diagram of a Parameter Estimator.

Referring to FIG. 3, a block diagram of the Parameter Estimator 38 is shown. The parameter estimator 38 determines certain characteristics of the received digitized signal ($DR_x$) which is a composite of several waveforms. The Parameter Estimator 38 determines the waveform characteristics of each user of the multi-user communication system 10 such as wave shape, amplitude, period, and phase shift, and sends this information to a Waveform Approximator 44. Also, the Parameter Estimator 38 receives training sequences prestored in the Receiver 14 from a data storage device referred to as the Known Data Memory 40. As shown in FIG. 3, the Parameter Estimator 38 may be embodied by a parameter estimation unit described in U.S. patent application publication Ser. No. US 2002/0037061 A1 entitled "System for Parameter Estimation and Tracking of Interfering Digitally Modulated Signals", filed Aug. 31, 2001 by Rachel E. Learned, published Mar. 28, 2002, assigned to the present Assignee and incorporated herein by reference.

Still referring to FIG. 3, the digitized signal ($DR_x$) from the Signal Sampler 18 has its power, timing offset, carrier frequency offset, and multipath structure tracked utilizing the initial values which are generated by analysis of the $DR_x$ signal. The initial values are applied to a Power Tracking Algorithm 54, a Timing Offset Tracking Algorithm 55, a Frequency Tracking Algorithm 56, and a Multipath Structure Tracking Algorithm 58, the outputs of which are parameters corresponding to the tracking of this particular signal. Also included is a unit 57, which estimates and tracks the relative phase of the digitized signal $DR_x$. Power tracking, timing offset tracking, phase tracking and multipath structure tracking may be done conventionally as described in "Spread Spectrum Communications Handbook", Simon, Omtura, Scholtz and Lebatt, McGraw Hill, Inc. 1994, or in any other manner described in the open literature including methods of estimating and/or tracking an entire channel transfer function from a known transmitted signal where the separate estimation of the power, timing offset, phase, frequency offset and multipath structure is not necessary. The User Waveform Characteristics 43 outputs correspond to the parameter values for the signals in the channel.

Referring to FIG. 2 and FIG. 3, FIG. 2 shows the Known Data Memory 40. One of the sources of information for the Parameter Estimator 38 and the Signal Sampler 18 is the Known Data Memory 40. This Memory 40 provides frequency data 41 needed for the Down Converter 32 and training sequences 39 for each User $12_1$–$12_n$ utilized by the Parameter Estimator 38. Further, the Known Data Memory 40 provides encoder data 42 to a Next-State Predictor 24. The encoder data 42 includes generator polynomials employed by each User's convolutional encoders as well as the initial states of the encoders. The Known Data Memory 40 has a capacity to store the representation of the generator polynomial data, the training sequences for all users, and the parameter set for the transmitters $12_1$–$12_n$ and receiver 14, and the initial states for all users's encoders.

The training sequence is a pseudo-random sequence of bits such that the sequences between the users have a low correlation with respect to each other. A four-stage shift register well known in the art may be used to generate such a pseudo-random sequence of bits. The bits in the shift register are loaded with a different initial state for each user (known by the Transmitters $12_1$ to $12_n$ and Receiver 14 prior to processing).

The Demodulator 46 receives the digitized composite signal ($DR_x$) from the Signal Sampler 13 and determines the approximate waveforms (~) received from a Waveform Approximator 44 closest to the $DR_x$. "Closest" can be defined as a mean square error distance, or highest correlation, etc. In the present invention the Demodulator 46 performs a minimum mean square error (MMSE) distance calculation to determine which waveform is the best choice for the symbol period in question. When the closest approximate waveform (~$T_x$) is found, a reverse look-up ~$T_x$ provides the most likely bit pattern transmitted referred to as $b_n$ where n represents the current symbol being processed.

Figure 4:
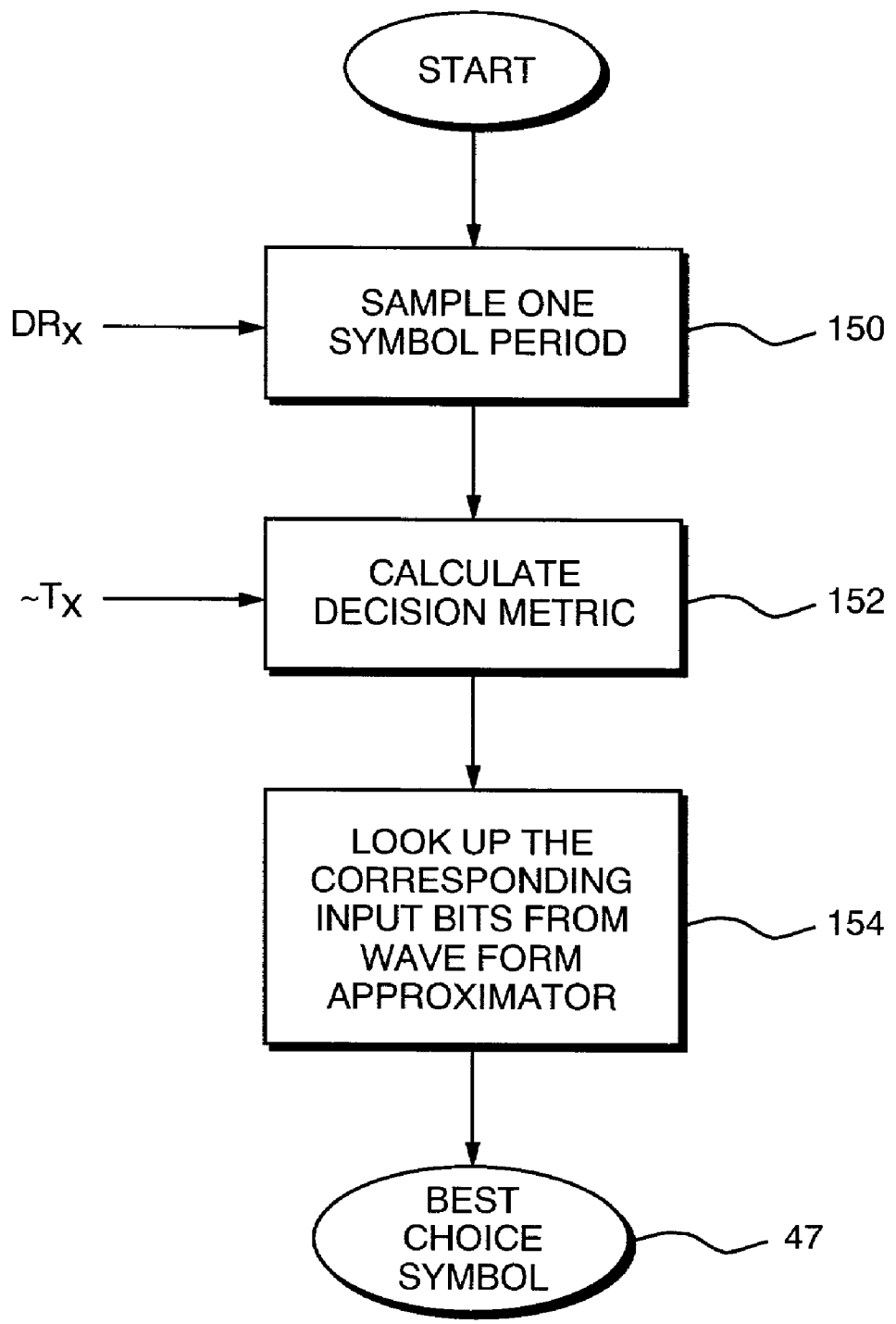
FIG. 4 is a flow chart of the Demodulator software component.

Referring now to FIG. 4, a flow chart of the Demodulator 46 software component is shown. First, the Demodulator 46 receives the digitized signal ($DR_x$) and samples one symbol period at step 150. Next, a calculate decision metric is performed at step 150 where the decision metric is calculated as the means square error distance between the received waveform and the set of possible composite waveforms ~$T_x$. The waveform in the set with the lowest MMSE distance in the decided waveform in the preferred embodiment. MMSE is calculated by the following expression:

$$\Sigma \| DR_x - \sim T_{x_i} \|^2$$

Where, $DR_x$ is the digitized composite waveform signal, and $T_{x_i}$ is an element in the set of possible composite waveforms (~$T_x$) 45. The MMSE distance is calculated for all elements in the set 45 to choose the best possible match.

Referring again to FIG. 2, the Next State Predictor 24 is a software component that generates a set of possible information bits ($T_x$) which are processed by the Waveform Approximator 44. The Waveform Approximator 44 generates the set of possible composite waveforms ~$T_x$ (without noise) which are sent to the Demodulator 46. The set of next-input bits is a set of all possible values and combinations of k bits. The value of k can be calculated by the state information given by the Known Data Memory 40.

Referring again to FIG. 2 and FIG. 6, FIG. 6 is a flow chart of the Next State Predictor 24 component. State information is held in a Convolutional Encoder at step 174 within shift registers. For k=1, each Encoder has an L-bit register to perform the encoding. The information in the last L−1 bits is known as the State of the Encoder. The L'th bit holds the next input, which is used to determine the next state of the Encoder. For k=1, the next possible inputs are "0" and "1". For k greater than 1, there are $2^k$ possible next inputs. This set is generated by the Generate Set of Possible Next Input Bits From Current State or Initial State of step 170 which is passed to step 172 for further processing. The state that the Receiver 14 is currently processing is passed to the Convolutional Encoder at step 174.

The inputs to the Convolutional Encoder at step 174 are the combinatoric set of possible bits stored during step 172 as well as the State passed through from step 170. The Convolutional Encoder's registers are populated with the State given by step 170 as well as the combinatoric set of possible bits at step 172, and is then encoded to determine the output bits. The Next State Predictor 24 starts with the initial state. Updating the Next State Predictor sets the current state.

Figure 5:
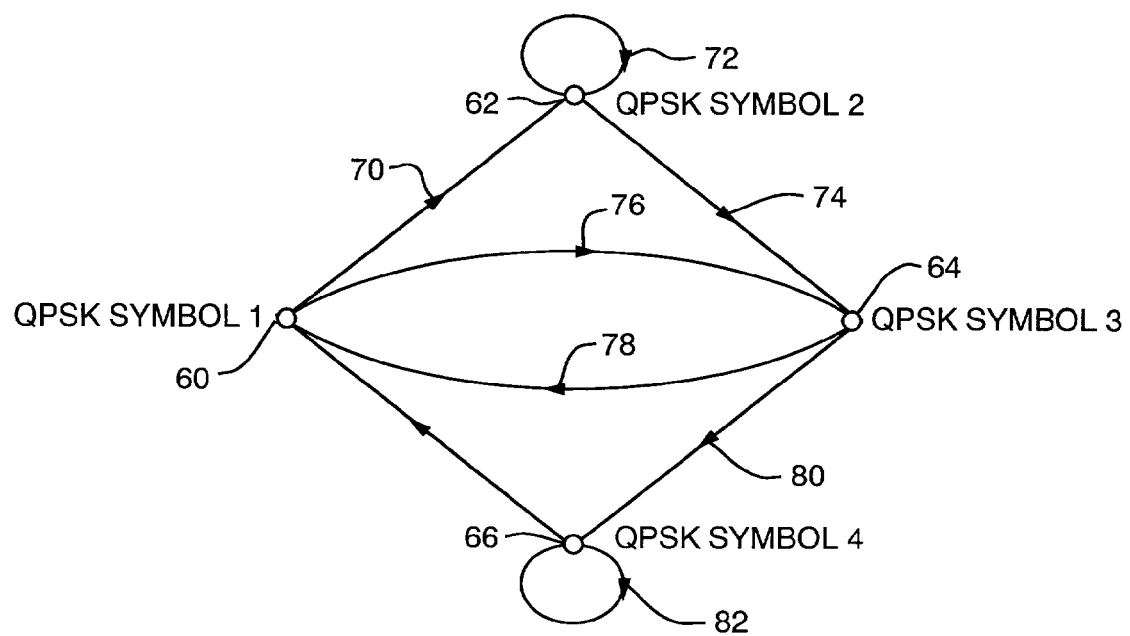
FIG. 5 is an encoder state diagram showing a limited number of transitions from a given state (or symbol)

Referring to FIG. 5, an encoder state diagram is shown. For many encoders, the underlying polynomial provides for a limited number of transitions from a given state (or symbol) which simplifies the decision processing for a complex multiuser system by reducing the number of next-states that have to be evaluated. For example, a four state encoder is shown in FIG. 5. This corresponds to an L=3 encoder. Each encoder has $2^{L-1}$ states. In this case, there are two transitions from state 60, one to state 62, and another to state 64. For L greater than 3, there are additional states in the diagram, with transitions given by the generator polynomials stored in the Known Data memory 40. Generation of transition data is well known in the art.

Table 1 is a state table in the Next State Predictor 24. The input bit corresponds to the data bit at the input of the transmitter $12_k$. This input bit is also the information bit intended to be transmitted by the users in transmitter $12_k$.

TABLE 1

| STATE | Next Output 47 From Demodulator 46, if Input = 0 | Next Output 47 From Demodulator 46, if Input = 1 |
|---|---|---|
| 000001 | 00 | 01 |
| 000010 | 10 | 00 |
| 000011 | 11 | 10 |
| S | $y_{11}$ | $y_{12}$ |
| " | " | " |
| " | " | " |

The Table 1 entries are defined as follows:

State (S) is the current state or the next state depending on the time you are processing. There are $2^{(constraint\ length-1)}$ entries in number of Users State tables. Constraint length L is the number of register bits in the Convolutional Encoder at step 174. L−1 is the length of the state in bits. The Lth bit is the current unknown input bit.

The next Input=0 is what the received waveform should represent, if a 0 is the next input bit.

The next Input=1 is what the received waveform should represent, if a 1 is the next input bit. There is one table per User $12_1$–$12_n$, as each User may be at a different state. The table entries are calculated by performing a matrix multiplication of the current state (or initial state) with the generator polynomial for both the input=0 and input=1 cases. That is, for the convolutional encoder registers (R) of step 174 in the Next State Predictor 24, R=[0 S(1×L−1 in size)] or [1 S (1×L−1 in size)] and generator polynomial=G (n×L in size) for k=1, each table entry $T_x$ is given as:

$$T_x = S \times G$$

The State Table 1 may be generated once for all states, or generated on the fly at each symbol period (in which case, only a line in the table is generated). The present embodiment generates the State Table 1 on the fly to save memory space. However, if more memory space is available, and quicker processing times are more desirable, generating all the State Tables for each user prior to transmission can be done.

Figure 6:
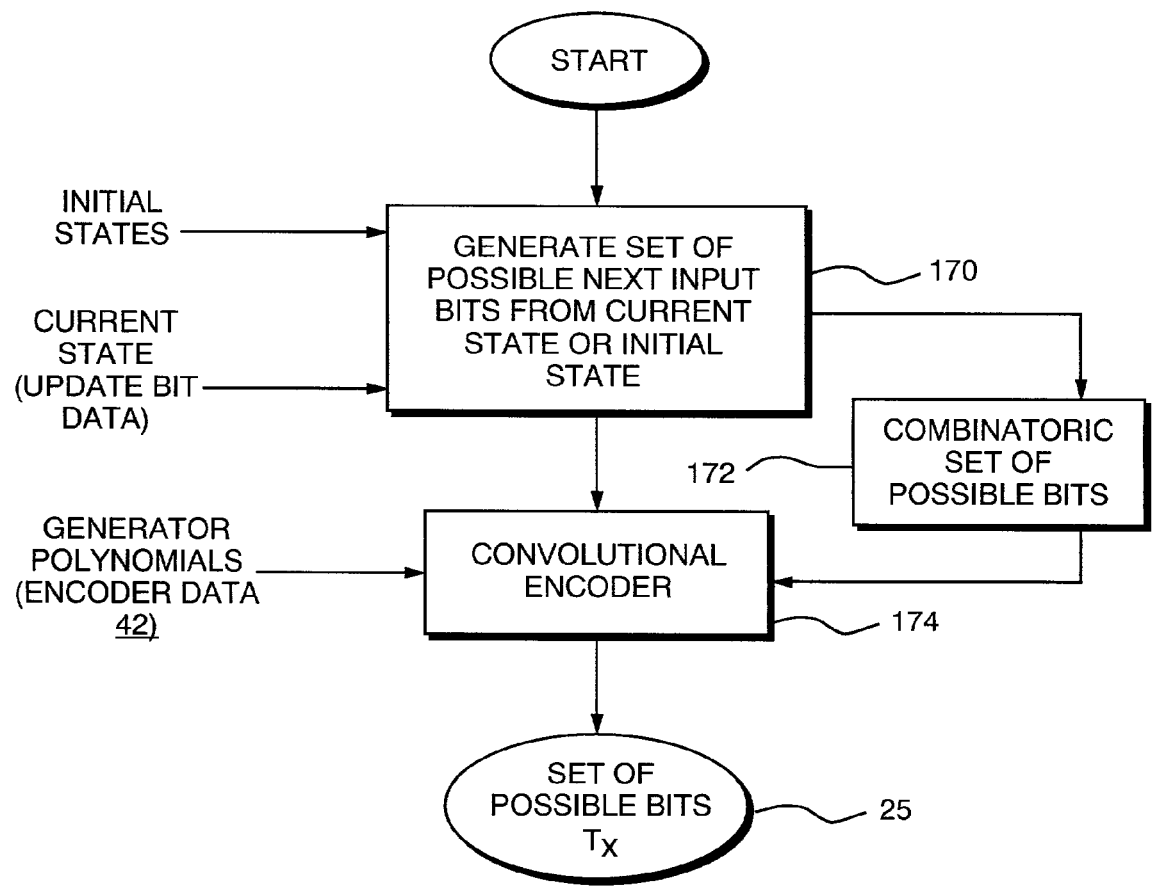
FIG. 6 is a flow chart of the Next State Predictor software component.

Still referring to FIG. 6, step 170 generates the table indexes (state information) and the possible input bits (these may be different for k≠1), and step 174 performs the convolutional encoding to fill out the table. Therefore, the output of the set of possible bits (T) 25 from the Next State Predictor 24 is Table 1.

Referring to FIG. 2 again, the Waveform Approximator 44 is a software component that receives user waveform characteristics 43 from the Parameter Estimator 38 and a set of possible bits ($T_x$) 25 from the Next State Predictor 24 and attempts to simulate modulation of individual user signals. The Waveform Approximator 44 adds such signals together in a proper manner as dictated by the parameters received from the Parameter Estimator 38. The Waveform Approximator 44 calculates a table of approximate waveforms for the set of bit values received from the Next State Predictor 24, and provides a set of possible composite waveforms ($\sim T_x$) 45 to the Demodulator 46. The table of approximate waveforms 45 is ordered by number of state and references the waveforms $\sim T_x$ to the set of possible bits $T_x$ 25 patterns associated with them provided by the Next State Predictor 24. Entries in such table are referred to as $\sim T_x$.

Figure 7:
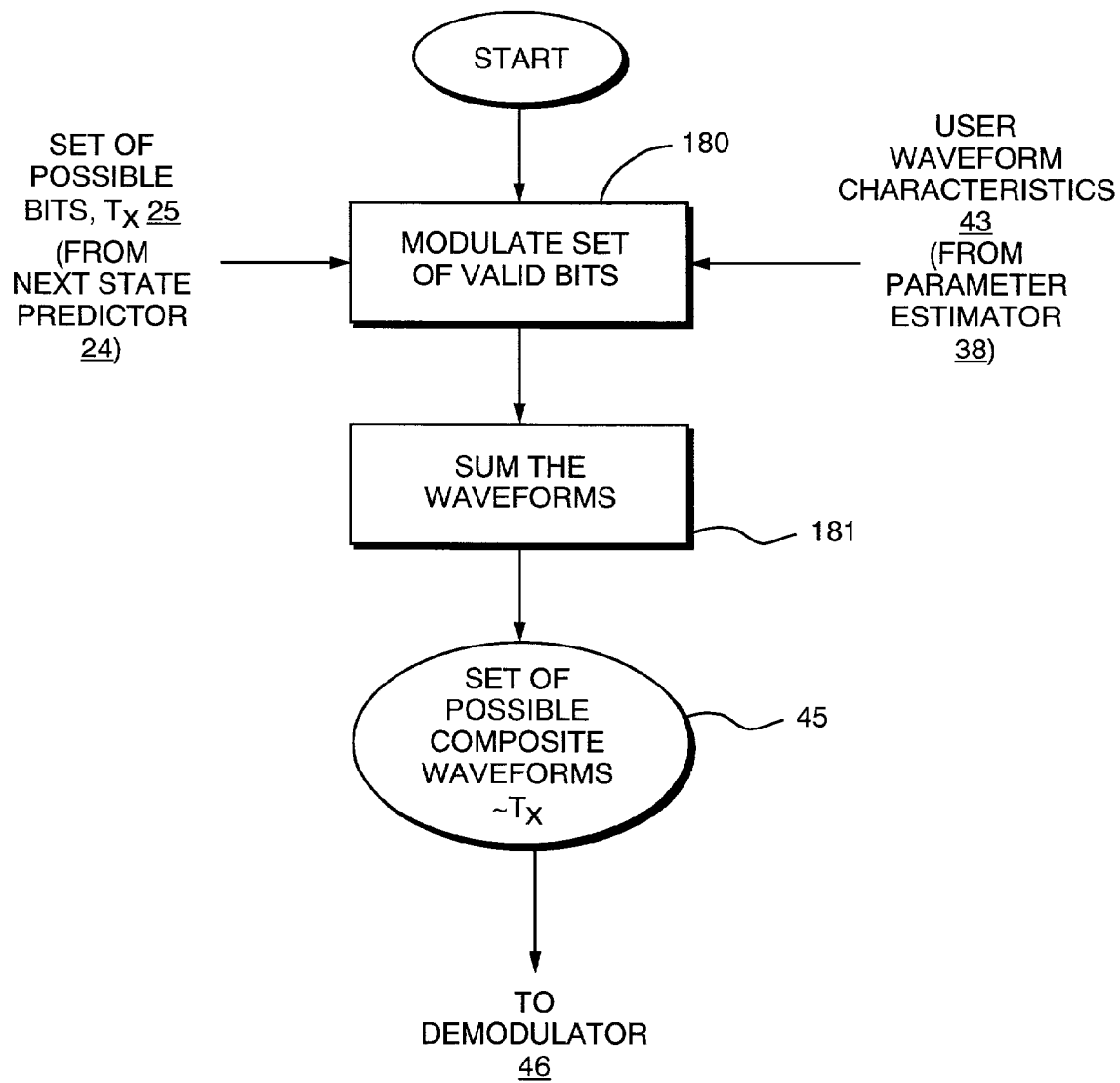
FIG. 7 is a flow chart of the Waveform Approximator software component.

Referring now to FIG. 2 and FIG. 7, FIG. 7 is a flow chart of the Waveform Approximator 44 software component. Step 180 receives the set of possible bits ($T_x$) 25 from the Next State Predictor 24, and user waveform characteristics 43 (including shape, delays, amplitudes, and symbol rates) from the Parameter Estimator 38. Step 180 then modulates the set of possible output bits 25 (in the case of Table 1, there are two possible output symbols) with these user waveform characteristics 43. Step 181 sums the waveforms from step 180 for each user and generates the set of Composite Waveforms 45 which is sent to the Demodulator 46.

The Demodulator 46 compares each element in the set of possible composite waveforms $\sim T_x$ to the received waveform $DR_x$ using the MMSE (Minimum Mean Square Error) decision procedure to determine the best matched waveform. The closest match identifies which table entry was received and what the next output symbol will be. This output symbol is sent to the convolutional decoder 26 for decoding. Alternatively, using a reverse table lookup of Table 1 also gives the information of what the next decoded information bit will be. In this case the output is the actual decoded bit making additional convolutional decoding unnecessary.

Referring again to FIG. 1 and FIG. 2, the convolutional decoder 26 is known to one skilled in the art and may be implemented in software or hardware. A Viterbi decoder is used in the present embodiment which receives the individual user symbols from the Demodulator 46 of the Decision Processor 22 and decodes the encoded data sent by each user $12_1$–$12_n$. Depending on processing speed requirements, one convolutional decoder may be used interatively or parallel convolutional decoders may be employed.

Figure 8B:
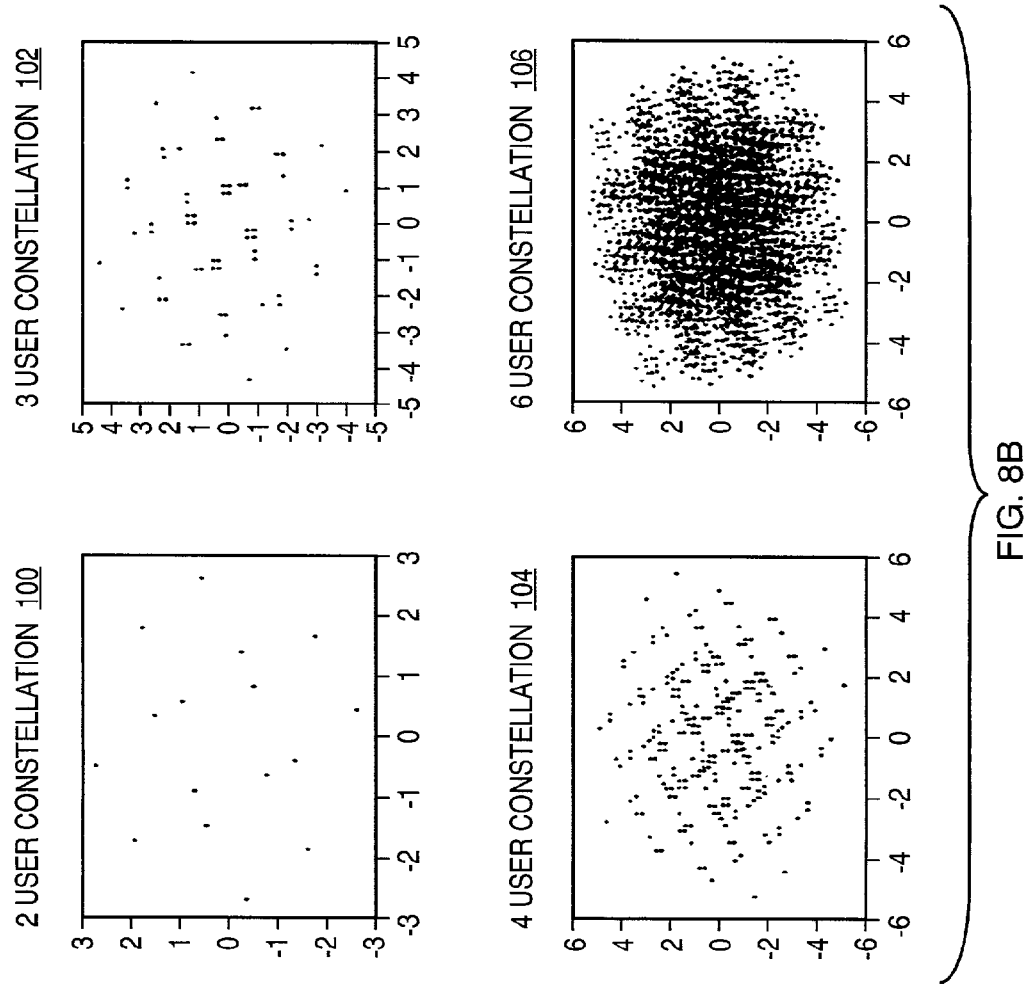
FIG. 8B illustrates examples of composite constellations for various co-channel interfering constellations.

Referring to FIGS. 8A and 8B, FIG. 8A shows examples of co-channel interfering individual user constellations for four different users 90, 92, 94, 96, and FIG. 8B shows examples of co-channel interfering composite constellations for 2 user constellation 100, 3 user constellation 102, 4 user constellation 104 and 6 user constellation 106. The diagrams in FIG. 8A of the individual user constellations show the in-phase and quadrature components for different symbols for four different users and it assumes all users are using QSPK modulation. The diagrams in FIG. 8B show that as the number of co-channel users (signals sharing common frequency and bandwidth) increases, the number of pseudo-constellation points increases dramatically. Normally, the Decision Processor 22 must compare the received amplitude and phase of the composite signal to each point in the diagram in an attempt to determine the received symbols.

Figure 9:
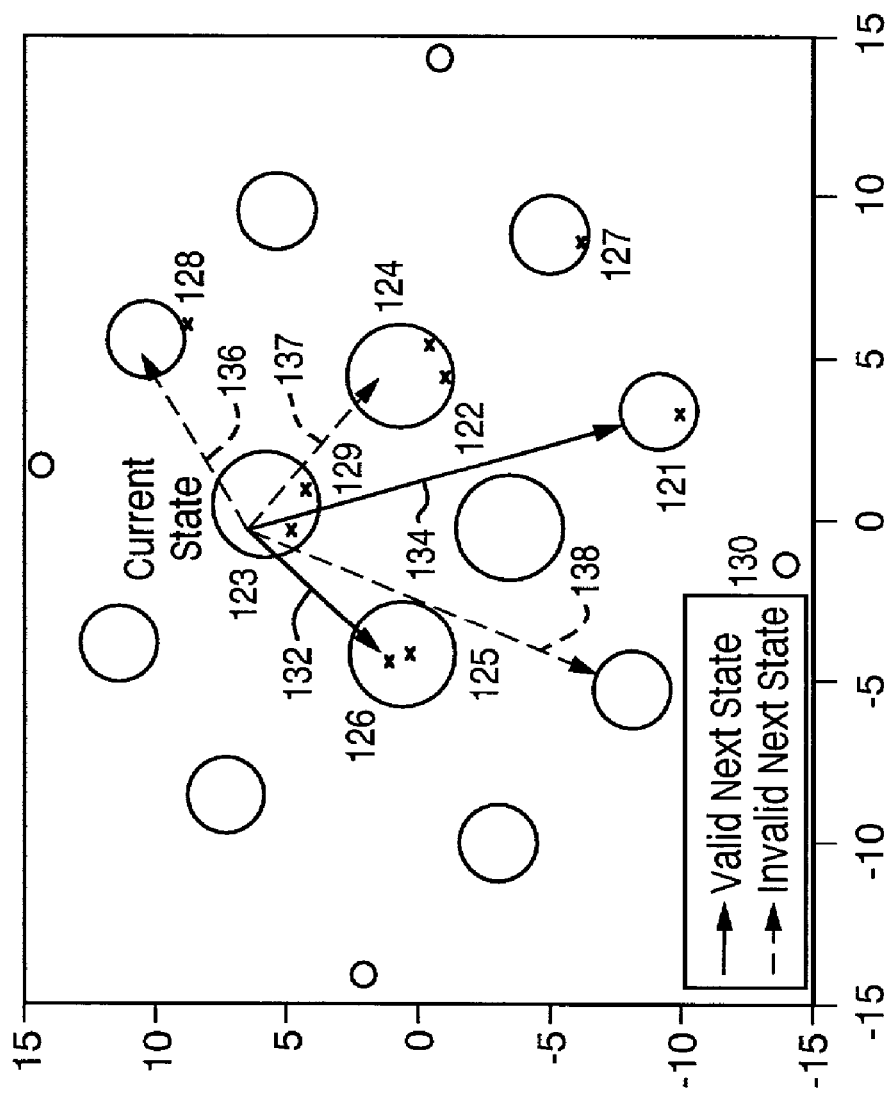
FIG. 9 illustrates a reduced search constellation produced by the Reduced Algorithm Receiver.

Referring to FIG. 9, a reduced search constellation is shown produced by the Reduced Algorithm Receiver 14. The circles show certain constellation mapping points. This diagram demonstrates that the Next-State Predictor 24 reduces the number of states that must be searched during each symbol interval by eliminating invalid next-states, reducing the processing overhead for the decision process. For example, as shown in FIG. 9, a current state is indicated by circle 'x' 123 and two valid next states 121 and 125 are indicated by solid arrows 134 and 132 respectively. Invalid next states are indicated by dashed arrows 136, 137 and 138.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A multiuser communication system comprising:
   at least two co-channel interfering user transmitters;
   a reduced algorithm receiver having an antenna for receiving a composite waveform signal from said transmitters;
   said receiver further comprises a signal sampler for converting said composite waveform signal to a digitized received composite signal;
   a decision processor, coupled to said signal sampler, comprises a next state predictor having a convolutional encoder for limiting the number of possible received symbol searches between consecutive symbol cycles using information from each user's unique encoder state diagram; and
   convolutional decoders, coupled to the output of said decision processor for receiving user symbols, and from said received user symbols determining a set of most likely symbols, reducing the number of possible symbols to said most likely set, and decoding encoded data of said most likely set from said user transmitters.

2. The multi-user communication system as recited in claim 1 wherein said decision processor comprises:
   a memory for storing predetermined data including training sequences for each of said user transmitters;
   a parameter estimator coupled to said signal sampler for determining waveform characteristics from each of said user transmitters;
   said next state predictor, coupled to said memory for receiving said predetermined data, reduces the number of said user symbols being searched during a current cycle in accordance with state data from said convolutional decoders;
   a waveform approximator coupled to outputs of said next state predictor and said parameter estimator for generating a set of possible composite waveforms; and
   a demodulator for comparing said set of possible composite waveforms to said digitized received signal to determine a best match waveform corresponding to a best choice symbol for a given symbol interval.

3. A reduced algorithm receiver comprising:
   means for converting a received composite waveform signal representing co-channel interfering-users to a received digital composite signal;
   means for storing predetermined data including training sequences for each of said users;
   means, coupled to said received composite waveform signal converting means and said predetermined data storing means, for determining waveform characteristics of said received digital composite signal;
   means, coupled to said data storing means, for predicting a set of possible next symbols, said predicting means comprises a convolutional encoder which receives encoder data and previous encoder data history from said storing means and updates symbol data received from convolutional decoders from previous state history of said convolutional decoders;
   means coupled to an output of said waveform characteristics determining means and an output of said next state predicting means for simulating modulation of individual user signals; and
   means, coupled to said output of said means for simulating modulation of individual user signals, for comparing a set of possible composite waveforms to said received digital composite signals and determining a best matched symbol from said reduced set of symbols.

4. The reduced algorithm receiver as recited in claim 3 wherein said receiver comprises convolutional decoders, coupled to the output of said comparing means, for receiving user symbols and decoding data sent by said users.

5. The reduced algorithm receiver as recited in claim 3 wherein said means for determining waveform characteristics of each of said users comprises means for determining amplitude and phase shift.

6. The reduced algorithm receiver as recited in claim 3 wherein said means for determining waveform characteristics of each of said users receives said training sequences for each of said users from said storing means.

7. The reduced algorithm receiver as recited in claim 3 wherein said encoder data received by said means for predicting a set of possible next symbols includes generator polynomials used by a convolutional encoder for each user.

8. The reduced algorithm receiver as recited in claim 3 wherein said means for comparing a set of possible composite waveforms to said received digital composite signals includes means for performing a minimum means square error distance calculation for determining said best matched waveform for a particular symbol period.

9. The reduced algorithm receiver as recited in claim 3 wherein said means for predicting a set of possible next symbols reduces the number of encoder states and symbols which must be searched during each symbol interval by eliminating invalid next states.

10. A reduced algorithm receiver comprising:
    a signal sampler for downconverting and digitizing a received composite waveform signal;
    a memory for storing predetermined data including training sequences for each of said user transmitters;
    a parameter estimator coupled to said signal sampler for determining waveform characteristics from each of said user transmitters;
    a next state predictor coupled to said memory for receiving said predetermined data for reducing the number of said user symbols being checked during a current cycle in accordance with an initial state or an update by an update bit, said next state predictor comprises a convolutional encoder which receives encoder data and previous encoder data history from said data memory and updates symbol data received from convolutional decoders from previous state history of said convolutional decoders;

a waveform approximator coupled to outputs of said next state predictor and said parameter estimator for generating a set of possible composite waveforms; and a demodulator for comparing said set of possible composite waveforms to said digitized received signal to determine a best match waveform corresponding to a best choice symbol for a given symbol interval.

11. The reduced algorithm receiver as recited in claim 10 wherein said receiver comprises said convolutional decoders for receiving user symbols and reducing the number of symbols decoding encoded data from said user transmitter.

12. A method for providing a reduced algorithm receiver comprises the steps of:

converting a received composite waveform signal representing co-channel interfering users to a received digitized composite signal;

storing in a memory predetermined data including training sequences for each of said users and previous encoder states from each of said users;

determining waveform characteristics of said received digitized composite signal for each of said users with means coupled to said received composite waveform signal converting means and said predetermined data storing memory;

predicting a set of possible next state data using convolutional encoder states for limiting the number of symbol searches between consecutive symbol cycles in accordance with previous encoder states from said memory and update bit data received from convolutional decoders;

simulating modulation of individual user signals, based on said waveform characteristics received from a parameter estimator and in accordance with said set of next state data, to produce a set of possibly transmitted composite waveforms;

comparing said set of possibly transmitted composite waveforms to said received digitized composite signals and determining a best match symbol from said limited number of symbol searches corresponding to a best choice symbol for a given symbol interval; and receiving said best match symbol in said convolutional decoders and decoding data sent by said users.

* * * * *